May 18, 1965 R. A. FRITZ 3,183,572
HOLDER FOR PIPE FORMING DEVICE
Filed Sept. 23, 1963 3 Sheets-Sheet 1

ROBERT A. FRITZ
INVENTOR

Huebner & Worrel
ATTORNEYS

May 18, 1965    R. A. FRITZ    3,183,572
HOLDER FOR PIPE FORMING DEVICE
Filed Sept. 23, 1963    3 Sheets-Sheet 3
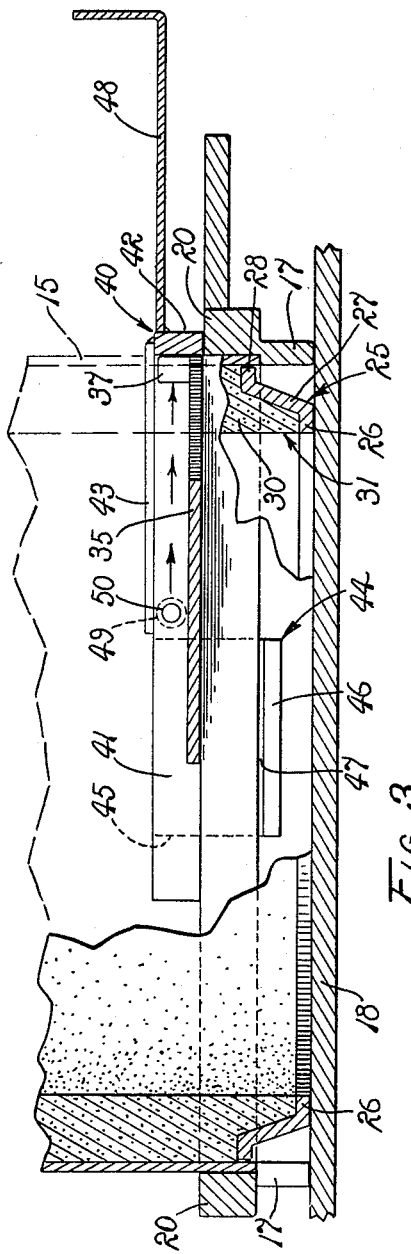
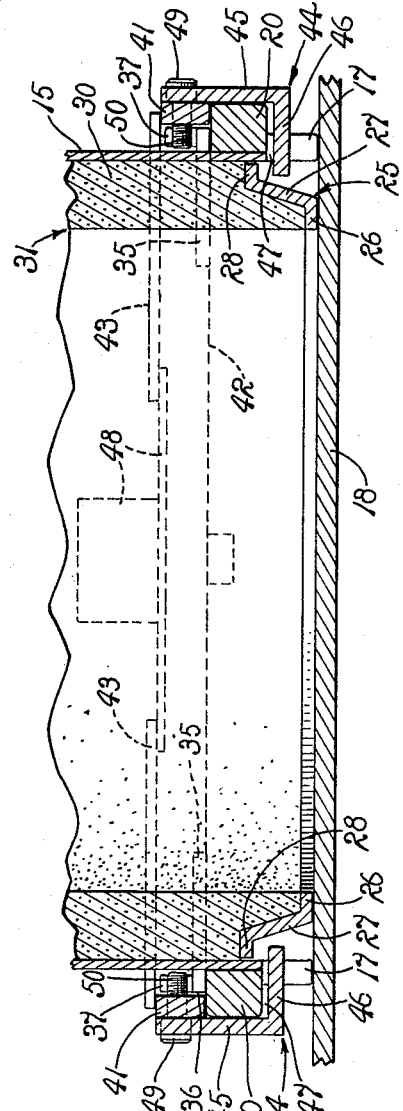
ROBERT A. FRITZ
INVENTOR
Huebner & Worrel
ATTORNEYS United States Patent Office 3,183,572
Patented May 18, 1965

3,183,572
HOLDER FOR PIPE FORMING DEVICE
Robert A. Fritz, Fresno, Calif., assignor to Fresno Valves, Inc., Fresno, Calif., a corporation of California
Filed Sept. 23, 1963, Ser. No. 310,627
7 Claims. (Cl. 25—126)

The present invention relates to a holder for a pipe forming device and more particularly to such a holder for constraining uncured pipe material within a pipe forming jacket between pouring and curing operations in the formation of concrete pipe and the like.

Conventional pipe forming devices consist of an elongated cylindrical pipe forming jacket which is supported in upstanding relation on a pouring platform in circumscribing relation to a pipe supporting pallet. After the pouring operation, the form jacket, pipe and pallet are transported from the platform to a curing area where the jacket is subsequently removed from the pipe. The cylindrical jacket is usually constructed of a plurality of elongated arcuate segments spring-hinged, or similarly connected, which are sprung apart or tediously dismantled when removing the jacket from the pipe. Such removal is difficult in that the pipe material tends to adhere to the jacket and is frequently damaged when the jacket segments are opened to free the pipe. Also, pipe material is sometimes permitted to harden about the fastening mechanisms between the segments of the jacket, making separation extremely difficult without scarring or otherwise damaging the outer surface of the pipe. Furthermore, with such devices, if jacket removal is attempted before complete curing of the pipe material, collapse of the pipe and clogging of the jacket occurs. In order to overcome these difficulties, certain devices of the prior art have provided continuous cylindrical sleeve type form jackets. Such jackets require a retractable connecting mechanism between the jacket and the pipe support pallet so that the jacket and pallet can be unitarily transported to the curing area and easily separated for subsequent removal of the jacket from the pipe. The connecting mechanisms of the prior art have not been as successful as desired in that they require complicated and unwieldly actuating linkages which must be manipulated while supporting the full weight of the pipe within the jacket.

Therefore, it is an object of the present invention to provide an improved holder for a pipe forming device.

Another object is to provide an improved holder for a pipe forming device having a sleeve type jacket circumscribing a pipe support pallet wherein the holder provides a readily manipulatable connection between the jacket and the pallet.

Another object is to provide such an improved holder which is automatically freed for unrestricted manipulation.

Another object is to provide an improved holder for a pipe forming device which permits the pipe and jacket to be automatically loosened from each other for easier separation.

Another object is to provide a holder of the character described which permits limited relative longitudinal movement between the jacket and the pipe prior to and during curing of the pipe therein to achieve a finish troweling effect on the outer surface of the pipe.

Another object is to provide an improved holder having a simplified structure which is conveniently manipulated and presents a minimum opportunity for pipe damage during handling, curing and separating.

Other objects and advantages of the present invention will subsequently become more fully apparent upon reference to the following description in the specification.

In the drawings:

FIG. 3 is a fragmentary transverse vertical section through the holder and jacket taken in a plane represented by the line 3—3 of FIG. 2.

FIG. 4 is a fragmentary transverse vertical section through the holder and jacket taken in a plane represented by the line 4—4 of FIG. 2 showing the holder in one operating position with respect to the pipe support pallet.

Figure 1:
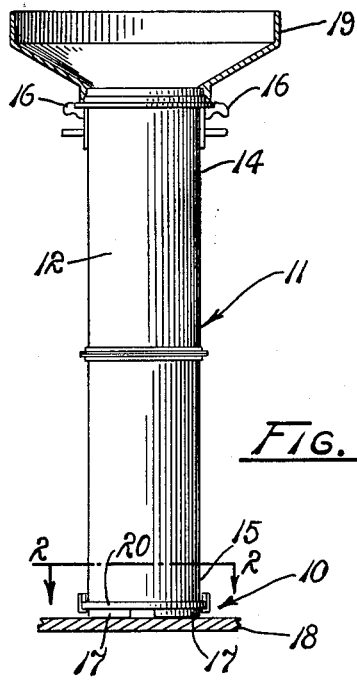
FIG. 1 is a side elevation showing the holder of the present invention disposed in the operating position on an elongated cylindrical pipe forming jacket.

Referring more particularly to the drawings, a holder embodying the principles of the present invention is generally indicated at 10 in association with a pipe forming device 11. The pipe forming device comprises an elongated cylindrical jacket 12 having predetermined open upper and lower ends 14 and 15, respectively. A plurality of outwardly extended hooks 16 are mounted on the jacket adjacent to its upper end which are adapted to be engaged by a lifting device, not shown, for jacket transporting purposes. A plurality of circumferentially spaced legs 17 are rigidly mounted in depending relation from the lower end 15 of the jacket to support the jacket in substantially upright attitude upon a platform fragmentarily represented at 18. The upper end 14 of the jacket mounts a pouring funnel 19 for receiving semi-solid pipe forming material such as aggregate cementitious compositions employed in the manufacture of irrigation pipe and the like. An annular guide ring 20 is rigidly mounted in circumscribing relation about the lower end 15 of the jacket adjacent to the legs 17.

A circular dish-shaped pallet 25 has a base portion 26, a continuous angularly outwardly disposed wall 27 upwardly extended therefrom and a radially outwardly extended flange portion 28 disposed in spaced substantially parallel relation to the base portion 26. The base portion 26 is adapted to rest on the platform 18 with the flange 28 freely slidable within the jacket 12. As best shown in FIG. 4, the pallet is positioned to support a wall 30 of a pipe 31 formed within the jacket 12. In conventional practice the pipe is formed within the jacket by a rotary material dispensing head, not shown, which is adapted to travel longitudinally of the jacket in material depositing relation to form the wall 30 of the pipe with an internal sleeve to support the internal surface of the pipe during concrete deposit but not subsequently. It is readily apparent, therefore, that during the curing operation the jacket must be handled with great care to prevent the collapse of the wall 31 within the jacket.

A pair of opposite stop support arms 35 are mounted on the lower end 15 of the jacket 12 upon the guide ring 20 and are outwardly extended therefrom in a common plane spaced from, and substantially parallel to, the platform 18. The arms provide spaced substantially parallel outer edges 36 which are substantially tangentially disposed with respect to the jacket 12. The support arms mount at their outer ends a substantially upright stop block 37 which is disposed substantially flush with the outer edges of the arms.

The holder 10 of the present invention provides a carriage 40 having a pair of elongated oppositely spaced substantially parallel legs 41 slidably engaging the upper surface of the guide ring 20 which are interconnected at their outer ends by a cross bar 42. For additional support, a pair of oppositely angularly disposed support bars 43 are rigidly mounted between each of the legs and the cross bars 42. A pair of elongated substantially L-shaped hangers 44, as viewed in FIG. 4, provide upright portions 45 individually rigidly mounted on the legs in substantially diametrically opposed relation to the jacket 12 and substantially horizontal coplanar lower plates 46. In such position, the lower plates are spaced in substantially parallel relation to the platform 18 and are spaced a predetermined distance below the flange 28 of the pallet 25 to provide a space 47 therebetween.

A substantially triangularly shaped control plate 48 is rigidly mounted on the cross bar 42 in outwardly extended relation therefrom intermediate the legs 41. Each of the legs 41 carries a capscrew 49 transversely therethrough having an end portion 50 extended inwardly of their respective legs in interfering relation to the stop blocks 37 on the support arms 35.

*Operation*

The operation of the described embodiment of the subject invention is believed to be clearly apparent and is briefly summarized at this point. With the jacket 12 disposed on the platform in the substantially upright position of FIG. 1, a predetermined quantity of cementitious or other casting material is introduced therein through the funnel 19 by a material distributing head, not shown. As in conventional practice, the distributing head is traveled longitudinally of the jacket to deposit the wall 30 of the cementitious material to form the pipe 31 within the jacket 12. The wall of the pipe is supported on the platform 18 by the pallet 25 with the flange 28 thereof disposed in a position circumscribed by the lower end 15 of the jacket.

Figure 2:
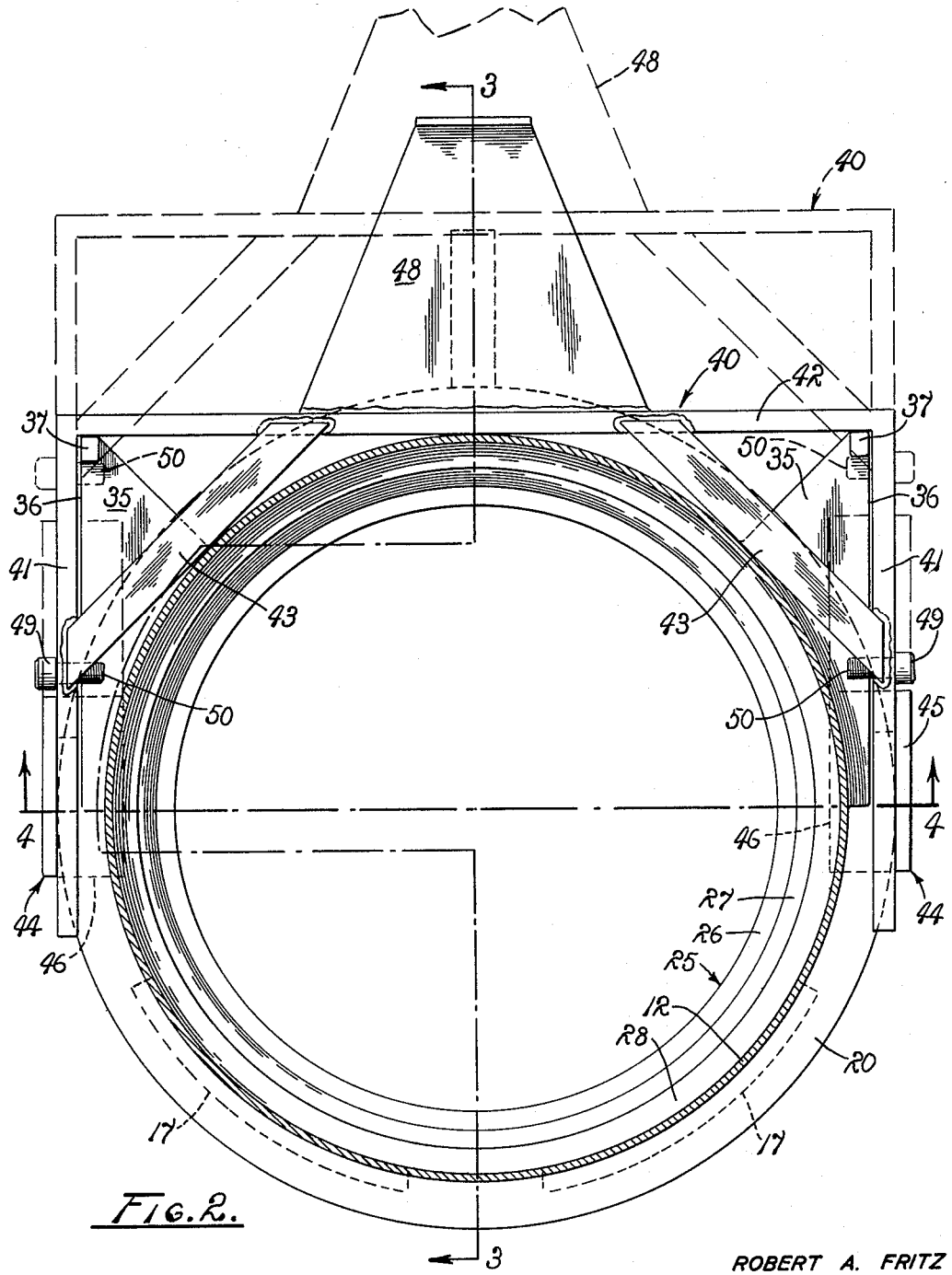
FIG. 2 is a transverse horizontal section through the pipe forming jacket taken on line 2—2 of FIG. 1.

In order to connect the pallet 25 and the jacket 12 for transporting the pipe 31 from the platform 18 to a remotely located curing area, the carriage 40 is manually actuated from the dashed line position shown in FIG. 2 to the full line position. During such movement, the legs 41 slide upon the guide ring 20 to move the hanger plates 46 radially inwardly of the jacket between the legs 17 thereof to a position spaced from and underlying the flange 28 of the pallet 25. Such movement is terminated by the support bars 43 abutting the jacket 12 and the stop blocks 37 simultaneously abutting the cross bar 42 of the carriage 40. It will be apparent that such movement of the carriage can be conveniently accomplished by engagement of the operator's foot with the control plate 48 of the carriage.

Figure 5:
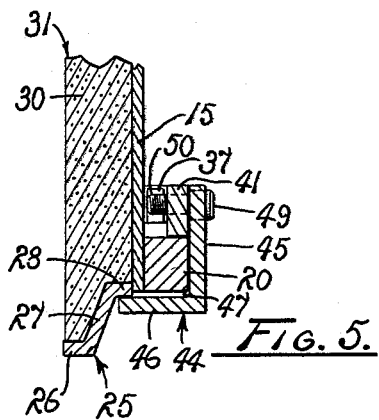
FIG. 5 is a fragmentary section similar to FIG. 4 but showing the holder and pallet in another operating position.
Figure 6:
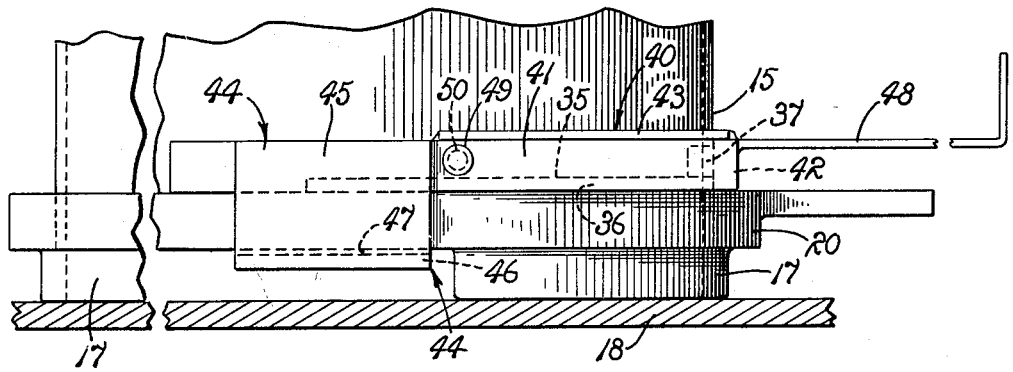
FIG. 6 is a somewhat enlarged fragmentary side elevation of the holder and jacket disposed in the position of FIGS. 3 and 4.

In order to transport the pipe forming device 11 from the platform 18 to a remotely located curing area, the hooks 16 are engaged by the lifting device, not shown, to elevate the jacket 12. Upon such elevational movement of the jacket 12, the carriage 40 is carried upwardly therewith relative to the pipe 31 and the pallet 25 which remain supported on the platform 18. Also, the hanger plates 46 move toward the flange 28 on the pallet to close the space 47 therebetween. The relative movement between the jacket and the pipe is terminated, as shown in FIG. 5, by engagement of the hanger plates 46 with the flange 28 of the pallet. With continued elevational movement of the lifting device, the pipe, pallet, jacket, and carriage are unitarily lifted for transport to the curing area. It is readily apparent that such relative movement between the pipe and the jacket has a beneficial result in that the movement has a troweling effect on the external surface of the pipe. In addition, such movement also helps to break loose the mating surfaces of the jacket and pipe for easier subsequent separation of said surfaces.

When the pipe forming device 11 reaches the curing area, the lifting device lowers the jacket 12 whereupon the base portion 26 of the pallet 25 first contacts the support surface on which the pipe forming device is to be rested. Further lowering of the lifting device permits the jacket and the hanger plates 46 of the carriage 40 to slide downwardly relative to the pipe and pallet again to produce a troweling effect between the mating surfaces of the jacket and the pipe until the legs 17 of the jacket engage and are rested upon the aforementioned support surface. Such operation re-establishes the space 47 between the flange 28 of the pallet 25 and the hanger plates thereby freeing the carriage for unrestricted transverse movement relative to the jacket. With such arrangement, it is readily apparent that at all times during the operation of the carriage, the hanger plates 46 are elevationally spaced from the flange of the pallet so that there is a minimum of resistance to manipulation of the carriage.

After the pipe 31 is sufficiently cured, the control plate 48 is moved outwardly of the jacket by the operator's foot to motivate the carriage 40 and hanger plates 46 to the dashed line position of FIG. 2. In such position, the hanger plates are disposed outwardly of the jacket to permit unrestricted relative movement longitudinally between the jacket and the pipe for stripping the same from the finished pipe.

In view of the foregoing, it is readily apparent that the structure of the present invention has provided an improved holder between the pipe supporting pallet and pipe forming jacket of a pipe forming device. Such connection incorporates a predetermined controlled amount of lost motion to provide relative movement between the pipe and jacket so that a troweling effect is produced on the external surface of the pipe resulting in a superior product. Such relative movement also minimizes sticking of the pipe within the jacket and minimizes the opportunity for damage to the pipe and clogging of the jacket. Furthermore, at all times during the operation of the holder, the pipe is supported independently of the holder so as not to impose any weight thereon for unrestricted manipulation of the control plate 48.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A holder, for constraining casting material within a cylindrical pipe forming jacket having a plurality of circumferentially spaced legs rested upon a support surface with the jacket disposed in substantially upright attitude for receiving such material in pipe forming relation and said jacket being adapted to be elevationally positioned with respect to said support surface, comprising a circular flanged member adapted to rest on such a support surface to support said pipe of material within the jacket, and carriage means transversely slidably mounted for rectilinear movement on the jacket having opposed lift means extended inwardly of the jacket between said legs in spaced relation beneath said flanged member when the jacket is rested upon the support surface in position subsequently to engage the flanged member during elevational movement of the jacket relative to the support surface in supporting relation to said flanged member and to said pipe.

2. A holder, for constraining casting material within a cylindrical pipe forming jacket having a plurality of circumferentially spaced legs rested upon a support surface with the jacket disposed in substantially upright attitude for receiving such cementitious material in pipe forming relation and said jacket being adapted to be elevationally positioned with respect to said support surface, comprising a circular flanged member adapted to rest on such a support surface to support said pipe of cementitious material within the jacket, and carriage means slidably mounted on the jacket having opposed lift members reciprocable transversely of the jacket in a rectilinear path between an operating position with the lift members extended inwardly of the jacket between said legs in spaced relation beneath said flanged member when the jacket is rested upon the support surface in position subsequently to engage the flanged member during elevational movement of the jacket relative to the support surface in supporting relation to said flanged member and to said pipe, and a retracted position with said lift members disposed outwardly of the jacket to permit removal of the jacket from the pipe.

3. A holder, for constraining cementitious material within a cylindrical pipe forming jacket having a plurality of circumferentially spaced legs rested upon a support surface with the jacket disposed in substantially upright attitude for receiving such cementitious material in pipe forming relation and said jacket being adapted to be elevationally positioned with respect to said support surface, comprising a circular flanged member adapted to rest on such a support surface to support said pipe of cementitious material within the jacket, guide means rigidly mounted on the jacket in outward extension therefrom, and carriage means slidably mounted on the guide means for movement in a rectilinear path transversely of the jacket having opposed lift members reciprocable between an operating position with the lift members extended inwardly of the jacket between said legs in spaced relation beneath said flanged member thus defining a space therebetween when the jacket is supported on said support surface whereby the lift members move upwardly relative to the flanged member during elevational movement of the jacket relative to the support surface and to the pipe in troweling relation thereto with said lift members subsequently engaging the flanged member in supporting relation to said pipe, and a retracted position with said lift members disposed outwardly of the jacket on the guide means to permit removal of the jacket from the pipe.

4. A holder, for constraining cementitious material within an elongated cylindrical pipe forming jacket having a plurality of circumferentially spaced legs rested upon a support surface with the jacket disposed in substantially upright attitude for receiving such cementitious material in pipe forming relation and said jacket being adapted to be elevationally positioned with respect to said support surface, comprising in combination a circular pallet adapted to rest on such support surface to support said pipe of cementitious material while curing within the jacket, said pallet having an outwardly extended annular flange receivable within the jacket, guide means rigidly mounted on the jacket adjacent to the pallet in outward extension therefrom, and carriage means slidably mounted on said guide means for movement in a rectilinear path transversely of the jacket having opposed lift members extendible inwardly of the jacket between said legs in a position beneath said annular flange of the pallet thus defining a space therebetween when the jacket is rested upon said support surface so as to permit relative longitudinal movement between the jacket and said pallet and said pipe prior to complete curing of the pipe so as to have a troweling effect thereon during elevational positioning of the jacket from the support surface until engagement of the lift members with the flange on the pallet.

5. A holder, for constraining cementitious material within an elongated cylindrical pipe forming jacket having a plurality of circumferentially spaced legs rested upon a support surface with the jacket disposed in substantially upright attitude for receiving such cementitious material in pipe forming relation and said jacket being adapted to be elevationally positioned with respect to said support surface, comprising a circular pallet adapted to rest on such support surface to support said pipe of cementitious material while curing within the jacket, said pallet having an outwardly extended annular flange receivable within the jacket, guide means rigidly mounted on the jacket adjacent to the pallet in outward extension therefrom, and carriage means slidably mounted on said guide means for movement in a rectilinear path transversely of the jacket having opposed lift plates reciprocable between an operating position with the lift plates extended inwardly of the jacket between said legs in overlapping relation to said flange of the pallet thus defining a space therebetween longitudinally of the jacket when the jacket is rested upon the support surface so as to permit relative longitudinal movement between the jacket and said pallet and said pipe prior to complete curing of the pipe to produce a troweling effect thereon during elevational positioning of the jacket from the support surface until engagement of the lift plates with the flange on the pallet, and a retracted position with said lift plates disposed outwardly of the jacket on the guide means to permit removal of the jacket from the pipe.

6. A holder, for constraining cementitious material within an elongated cylindrical pipe forming jacket having a plurality of circumferentially spaced legs rested upon a support surface with the jacket disposed in substantially upright attitude for receiving such cementitious material in pipe forming relation and said jacket being adapted to be elevationally positioned with respect to said support surface, comprising a circular pallet adapted to rest on such support surface to support said pipe of cementitious material while curing within the jacket, said pallet having an outwardly extended annular flange receivable within the jacket, a guide ring rigidly mounted on the jacket in circumscribing relation adjacent to said pallet on the support surface; and a carriage having a pair of oppositely spaced substantially parallel legs adapted to receive said jacket therebetween and being slidably supported upon the guide ring for reciprocable rectilinear movement transversely of the jacket, each of said legs having an elongated hanger plate rigidly mounted thereon and extended inwardly of the jacket between said legs in overlapping relation to said flange of the pallet thus defining a space therebetween longitudinally of the jacket when the jacket is rested upon the support surface so as to permit relative longitudinal movement between the jacket and said pallet and said pipe prior to complete curing of the pipe to produce a troweling effect thereon during elevational positioning of the jacket from the support surface until engagement of the hanger plates with the flange on the pallet, and a retracted position with said hanger plates disposed outwardly of the jacket on the guide ring to permit removal of the jacket from the pipe.

7. A holder, for constraining cementitious material within an elongated cylindrical pipe forming jacket having a plurality of circumferentially spaced legs rested upon a support surface with the jacket disposed in substantially upright attitude for receiving such cementitious material in pipe forming relation and said jacket being adapted to be elevationally positioned with respect to said support surface, comprising a circular pallet adapted to rest on such support surface to support said pipe of cementitious material while curing within the jacket, said pallet having an outwardly extended annular flange receivable within the jacket, an annular guide ring rigidly mounted on the jacket in circumscribing relation adjacent to said pallet on the support surface; a carriage having a pair of oppositely spaced substantially parallel legs adapted to embrace the jacket in reciprocable relation thereto on the guide ring for rectilinear movement transversely of the jacket, a pair of elongated hanger plates individually rigidly mounted on the legs having lower inwardly turned shelf portions extended between the legs of the jacket in overlapping relation to said flange on the pallet to define a longitudinal space therebetween when the jacket is rested upon said support surface to permit relative longitudinal movement between the jacket and said pallet and the pipe prior to complete curing of the pipe to produce a troweling effect thereon during elevational positioning of the jacket from the support surface prior to engagement of the shelf portions of the hanger plates with the flange on the pallet, stop means rigidly mounted on the jacket in outward extension therefrom in juxtaposition to said legs of the carriage, and stop bolts carried by the legs adjacent to the hanger plates in interfering relation with said stop means to limit reciprocable travel of the carriage at a position with the hanger plates disposed outwardly of the jacket to permit unrestricted removal of the jacket from the pipe.

References Cited by the Examiner

UNITED STATES PATENTS

| | | | |
|---|---|---|---|
| 540,851 | 6/95 | Burrage | 292—42 |
| 547,368 | 10/95 | Blech | 292—300 |
| 1,724,362 | 8/29 | Peterson | 292—288 |
| 2,585,756 | 2/52 | Eschenbrenner | 25—127 |
| 2,684,517 | 7/54 | Woods | 25—126 |
| 3,078,121 | 2/63 | Dempster et al. | 292—42 |

FOREIGN PATENTS

| | | |
|---|---|---|
| 1,113,660 | 9/61 | Germany. |
| 501,027 | 11/54 | Italy. |

MICHAEL V. BRINDISI, *Primary Examiner.*
ROBERT F. WHITE, *Examiner.*